United States Patent
Tan et al.

(10) Patent No.: US 10,800,039 B2
(45) Date of Patent: Oct. 13, 2020

(54) CONTROLLING AND COMMANDING AN UNMANNED ROBOT USING NATURAL INTERFACES

(71) Applicant: General Electric Company, Schenectady, NY (US)

(72) Inventors: Huan Tan, Clifton Park, NY (US);
Ghulam Ali Baloch, Albany, NY (US);
Yang Zhao, Schenectady, NY (US);
Mauricio Castillo-Effen, Rexford, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 321 days.

(21) Appl. No.: 15/877,796

(22) Filed: Jan. 23, 2018

(65) Prior Publication Data
US 2019/0224849 A1    Jul. 25, 2019

(51) Int. Cl.
*G05B 19/04* (2006.01)
*G05B 19/18* (2006.01)
(Continued)

(52) U.S. Cl.
CPC ............. *B25J 9/1669* (2013.01); *B25J 13/00* (2013.01); *B25J 19/021* (2013.01); *B25J 19/026* (2013.01);
(Continued)

(58) Field of Classification Search
CPC ........ B25J 9/1669; B25J 13/00; B25J 19/026; B25J 19/021; G06F 3/167; G06K 9/6277;
(Continued)

(56) References Cited

U.S. PATENT DOCUMENTS

| 8,214,098 B2 | 7/2012 | Murray et al. |
| 8,942,849 B2 * | 1/2015 | Maisonnier .......... B25J 11/0005 700/250 |

(Continued)

FOREIGN PATENT DOCUMENTS

| CN | 106200679 A | 12/2016 |
| CN | 106933133 A | 7/2017 |
| WO | 2013123944 A1 | 8/2013 |

OTHER PUBLICATIONS

Krishna, R. Vivek et al., "Design of Voice and Gesture Controlled Quadcopter", Innovations in Information, Embedded and Communication Systems (ICIIECS), 2015 International Conference on, 2015, Coimbatore, 6pgs.

(Continued)

*Primary Examiner* — Harry Y Oh
(74) *Attorney, Agent, or Firm* — Fletcher Yoder, P.C.

(57) ABSTRACT

The example embodiments are directed to a system and method for controlling and commanding an unmanned robot using natural interfaces. In one example, the method includes receiving a plurality of sensory inputs from a user via one or more natural interfaces, wherein each sensory input is associated with an intention of the user for an unmanned robot to perform a task, processing each of the plurality of sensory inputs using a plurality of channels of processing to produce a first recognition result and a second recognition result, combining the first recognition result and the second recognition result to determine a recognized command, and generating a task plan assignable to the unmanned robot based on the recognized command and predefined control primitives.

19 Claims, 5 Drawing Sheets

(51) Int. Cl.
- *B25J 9/16* (2006.01)
- *G10L 15/22* (2006.01)
- *G06K 9/00* (2006.01)
- *G06K 9/62* (2006.01)
- *B25J 19/02* (2006.01)
- *B25J 13/00* (2006.01)
- *G06F 3/16* (2006.01)
- *G10L 15/19* (2013.01)

(52) U.S. Cl.
CPC ......... *G06F 3/167* (2013.01); *G06K 9/00342* (2013.01); *G06K 9/00355* (2013.01); *G06K 9/6262* (2013.01); *G06K 9/6277* (2013.01); *G10L 15/22* (2013.01); *G10L 15/19* (2013.01); *G10L 2015/223* (2013.01); *Y10S 901/01* (2013.01); *Y10S 901/44* (2013.01)

(58) Field of Classification Search
CPC ............. G06K 9/00355; G06K 9/6262; G06K 9/00342; Y10S 901/01; Y10S 901/44; G10L 15/19; G10L 15/22; G10L 2015/223

See application file for complete search history.

(56) References Cited

U.S. PATENT DOCUMENTS

| | | | |
|---|---|---|---|
| 9,459,620 B1* | 10/2016 | Schaffalitzky | G05D 1/0016 |
| 9,599,992 B2 | 3/2017 | Kohstall | |
| 9,747,901 B1 | 8/2017 | Gentry | |
| 10,059,447 B2* | 8/2018 | Wang | B64C 27/08 |
| 10,156,854 B2* | 12/2018 | Yang | G05D 1/0011 |
| 10,198,749 B1* | 2/2019 | Haskin | G06Q 10/0833 |
| 10,228,695 B2* | 3/2019 | Rezvani | B64C 39/024 |
| 10,310,617 B2* | 6/2019 | Ekandem | G06F 1/163 |
| 10,370,102 B2* | 8/2019 | Boykin | H04B 7/18506 |
| 10,409,276 B2* | 9/2019 | Wang | G05D 1/0016 |
| 10,496,087 B2* | 12/2019 | Choi | G05D 1/0038 |
| 10,509,410 B2* | 12/2019 | Hammond | G05D 1/0214 |
| 10,520,944 B2* | 12/2019 | Kunzi | G08G 5/0021 |
| 10,696,308 B2* | 6/2020 | Rider | B60W 50/10 |
| 2013/0176425 A1* | 7/2013 | Lerner | H04N 5/2351 348/135 |
| 2016/0364004 A1* | 12/2016 | Ekandem | G06K 9/00355 |
| 2016/0378109 A1 | 12/2016 | Raffa et al. | |
| 2017/0174344 A1 | 6/2017 | Lema et al. | |
| 2017/0206648 A1 | 7/2017 | Marra et al. | |

OTHER PUBLICATIONS

Cacace, Jonathan et al., "Multimodal Interaction with Multiple Co-located Drones in Search and Rescue Missions", ResearchGate, Technical Report, May 24, 2016, arXiv:1605.07316v1 [cs.RO], 6pgs.

Alex "Raw and Uncut Drops Today", Dec. 19, 2014, [EMG] [Developer News], http://developerblog.myo.com/raw-uncut-drops-today/, Retrieved on Nov. 6, 2017, 5pgs.

"What's included?", MYO, Tech Specs, Thalmic Labs Inc, https://www.myo.com/techspecs, Retrieved on Nov. 6, 2017, 8pgs.

Iqbal, Sajid "MYO Gesture Control Armband", Latest Tech News, Mar. 7, 2016, http://latesttechnews2016.blogspot.com/2016/03/myo-gesture-control-armband-is-device.html?_sm_au_=ifHHL65rDMLvqWfH, Retrieved on Nov. 24, 2017, 2pgs.

"Myo Gesture Control Armband Review: Great Idea, Underwhelming Implementation", Beebom, Sep. 29, 2016, "https://beebom.com/myo-gesture-control-armband-review/", Retrieved on Nov. 24, 2017, 13pgs.

Craparo, Emily M. "Natural Language Processing for Unmanned Aerial Vehicle Guidance Interfaces", Department of Aeronautics and Astronautics, 2002, 78pgs.

Fernandez, Ramon A. Suarez et al., "Natural User Interfaces for Human-Drone Multi-Modal Interaction", 10pgs.

Stenmark, Maj "Intuitive Instruction of Industrial Robots: A Knowledge-Based Approach", Lund University, Faculty of Engineering, Department of Computer Science, 2017, (cover 13pgs + Part 1, 1-76, 90 total pages)—Part 1.

Stenmark, Maj "Intuitive Instruction of Industrial Robots: A Knowledge-Based Approach", Lund University, Faculty of Engineering, Department of Computer Science, 2017, (pp. 77-118, 42 total pages)—Part 2.

Stenmark, Maj "Intuitive Instruction of Industrial Robots: A Knowledge-Based Approach", Lund University, Faculty of Engineering, Department of Computer Science, 2017, (pp. 119-214, 96 total pages)—Part 3.

International Search Report/Written Opinion; PCT/US2018/066200 dated Apr. 1, 2019; 13 pages.

* cited by examiner

CONTROLLING AND COMMANDING AN UNMANNED ROBOT USING NATURAL INTERFACES

BACKGROUND

Machine and equipment assets are engineered to perform particular tasks as part of a business process. For example, assets can include, among other things and without limitation, industrial manufacturing equipment on a production line, drilling equipment for use in mining operations, wind turbines that generate electricity on a wind farm, transportation vehicles, and the like. As another example, assets may include devices that aid in diagnosing patients such as imaging devices (e.g., X-ray or MRI systems), monitoring equipment, and the like. The design and implementation of these assets often takes into account both the physics of the task at hand, as well as the environment in which such assets are configured to operate.

Low-level software and hardware-based controllers have long been used to drive machine and equipment assets. However, the rise of inexpensive cloud computing, increasing sensor capabilities, and decreasing sensor costs, as well as the proliferation of mobile technologies, have created opportunities for creating novel industrial and healthcare based assets with improved sensing technology and which are capable of transmitting data that can then be distributed throughout a network. As a consequence, there are new opportunities to enhance the business value of some assets through the use of novel industrial-focused hardware and software.

In industrial assets inspection tasks, one/several robots or unmanned aerial vehicles (UAVs) (e.g., flying robot/drone) navigate in the environment autonomously to collect sensory data. Most of time, tasks of these UAVs are planned before a flying. However, in some situations, human operators need to monitor the inspection and give supervisory commands to guide the robots.

Some conventional approaches attempt to use traditional screen-based menus and buttons to control the robot or send robot commands. Such methods require a lot of training on human operators, which is often time-consuming.

What is needed is system and method capable of integrating human natural interaction with task primitives.

SUMMARY

Embodiments described herein improve upon the prior art by providing systems and methods which enable the use of natural interfaces for controlling and commanding an unmanned robot such as a drone. The disclosed embodiments include a system for human operators to guide a robot to perform inspection tasks using natural interfaces for human-computer interaction including speech, gesture, etc.

In an aspect of an example embodiment, provided is a robotic computing system for recognizing gestures, recognizing speech, combining information from different natural interfaces into one channel, conducting probabilistic decision-making operations and inspection task planning based on commands and inspection primitives. In this way, information for controlling and commanding an unmanned robot may be provided in a user-friendly manner through the natural interfaces of speech and gestures, for example.

Several inspection-related tasks are predefined and stored in a library. These tasks could be motion-based, sensing-based, reporting-based, etc. The observed commands are associated with predefined tasks for robots to perform. When interactions happen between robots and humans, the intention hidden in and recognized from human activities is used for robots to decide what they will do for the next step. A probabilistic decision-making model is implemented for robots to switch between different tasks to respond to the interaction and activities of humans.

Advantageously, integrating human natural interaction with robotic inspection largely reduces the workload on training operators. The system framework incorporates different channels of information and plans robots' tasks based on the recognized commands and predefined semantic primitives. Accordingly, the extensibility and robustness of the system is largely improved, and user experience is also improved.

Other features and aspects may be apparent from the following detailed description taken in conjunction with the drawings and the claims.

BRIEF DESCRIPTION OF THE DRAWINGS

Features and advantages of the example embodiments, and the manner in which the same are accomplished, will become more readily apparent with reference to the following detailed description taken in conjunction with the accompanying drawings which are briefly described as follows.

Figure 1:
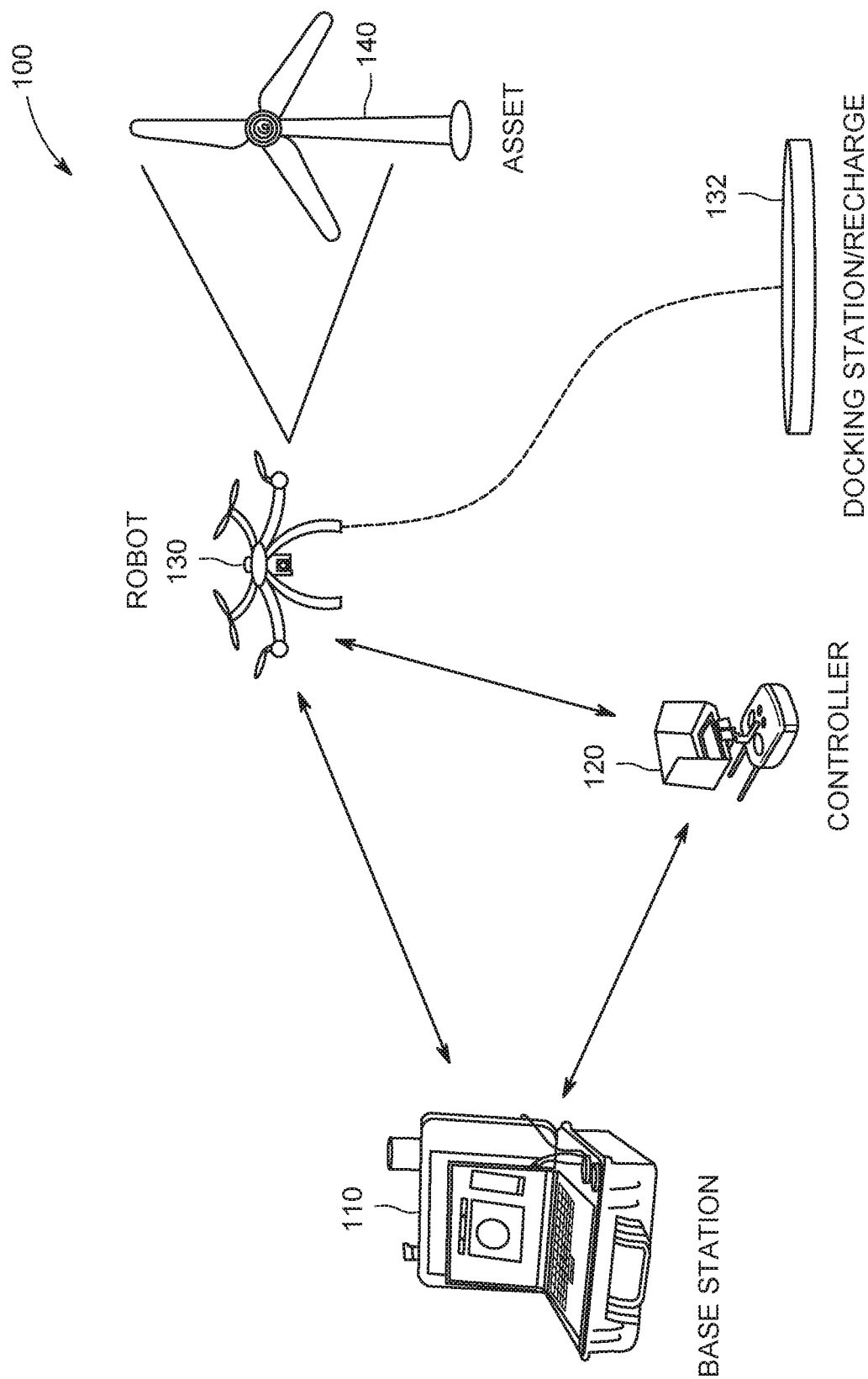
FIG. 1 is diagram illustrating a robotic system according to some embodiments.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The disclosed embodiments utilize natural interfaces to control and command an unmanned robot.

FIG. 1 illustrates a robotic system 100 according to some embodiments. Referring to FIG. 1, the robotic system 100 includes an unmanned robot 130 that inspects an asset 140. For example, the unmanned robot 130 may include an unmanned aerial vehicle (UAV) such as a drone, a crawling robot, a rolling robot, a walking robot, an autonomous underwater vehicle (AUV), and/or the like. In the example of FIG. 1, the unmanned robot 130 includes a docking station 132 for recharging and storage. Also, the unmanned robot 130 may communicate with a controller 120 and/or a base station 110. For example, the controller 120 and the base station 110 may receive data from and transmit data to the unmanned robot 130 via a data communication channel. Also, in some examples the base station 110 may receive input from a user (e.g., an engineer) sending commands to the unmanned robot 130 via the data communication channel. The communication channel may be wireless, for example, satellite, cellular, local, and/or the like, and/or it may be wired in some instances.

The asset 140 may be a structure that is disposed at a geographical location accessible by the unmanned robot 130. For example, the asset 140 may be an oil platform disposed at sea, a tank or well that is disposed under the earth's surface, a pipeline disposed along the earth's surface, a bridge, a dam, a gas flare, a turbine, a power grid, an aircraft, a locomotive, and/or the like. Based on an inspection plan, the unmanned robot 130 may autonomously move about and around the asset 140 while inspecting (e.g., collecting data) from the asset 140. In the example of FIG. 1, the unmanned robot 130 is a drone that can fly about the asset 140. The drone can land on locations on a surface of the asset 140, pause in mid-air, and the like. In some embodiments, the drone 130 may fly about a travel path around the asset 140 based on a 3D model of a virtual travel path included in a flight inspection plan. In some cases, the drone 130 may also receive instructions providing a travel path from the docking station 132 to a starting point of the flight inspection plan.

Note that the unmanned robot 130 may include at least one sensor to collect the sensor data. According to some embodiments, a sensor might be associated with, for example, a camera (e.g., a Red-Green-Blue ("RGB") camera), a video camera, an Infra-Red ("IR") camera, a microphone, a chemical detector, a Light Detection and Ranging ("LIDAR") sensor, a radiation detector, etc. Although some examples are described herein in connection with a single inspection device or robot, note that an inspection plan might instead be associated with a plurality of inspection devices or robots simultaneously collecting information.

According to various embodiments, the unmanned robot 130 may perform an inspection of a plurality of regions of interest of the asset 140 based on a 3D virtual inspection plan that is received from the base station 110, the controller 120, or input locally through the unmanned robot 130. The regions of interest may be positioned at various distributed locations throughout the asset 140, clustered within a predefined area of the asset 140, and/or the like. Each region of interest may include a position such as a point of interest, an area of interest, etc., to be inspected on the asset, an angle at which the camera (or other sensor) should be positioned with respect to a surface of the asset at the region of interest, an angle of rotation about the asset that the drone should travel while capturing sensor data, and the like.

Figure 2:
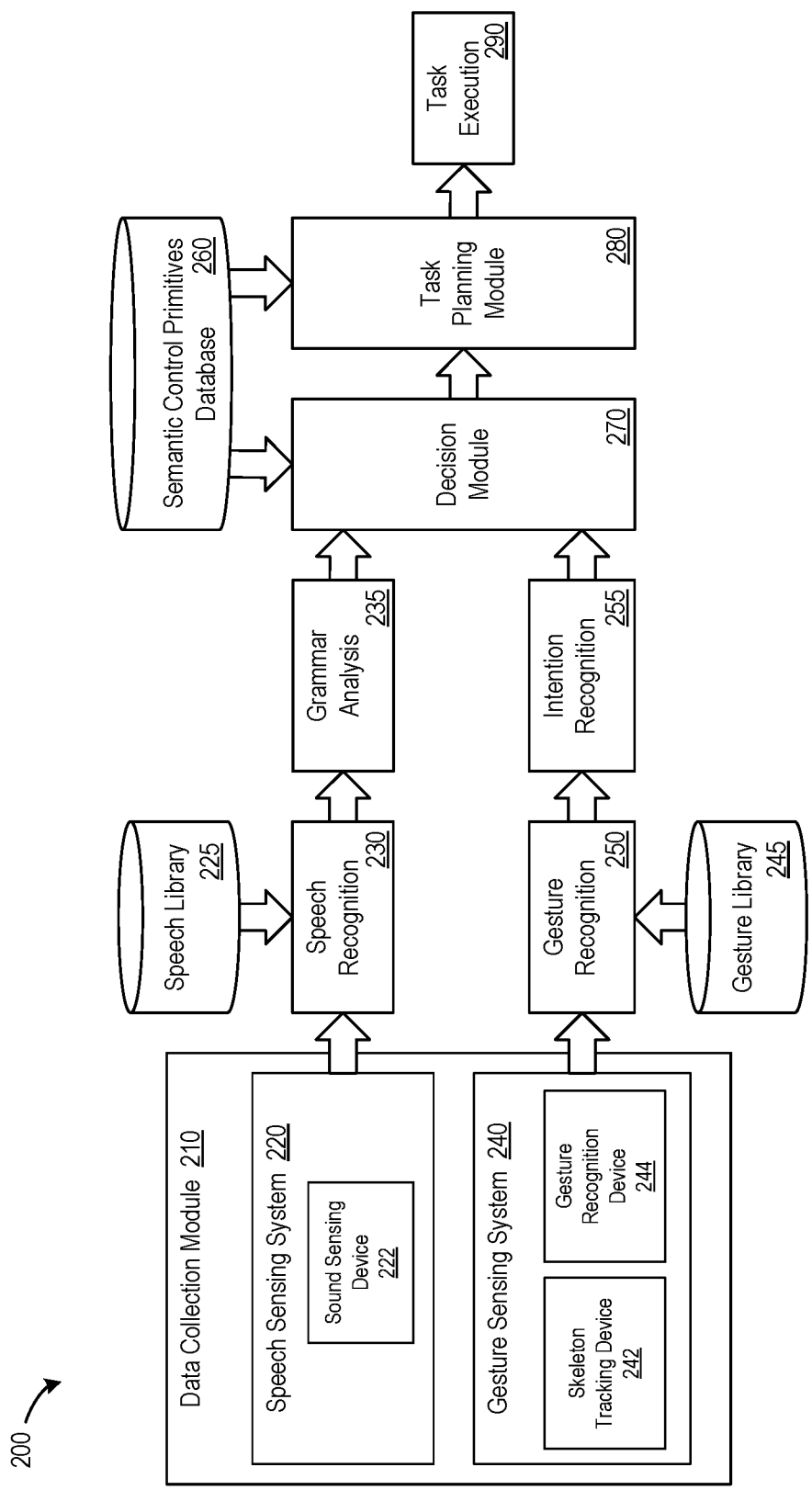
FIG. 2 is a block diagram of an overall system architecture according to some embodiments.
Figure 3:
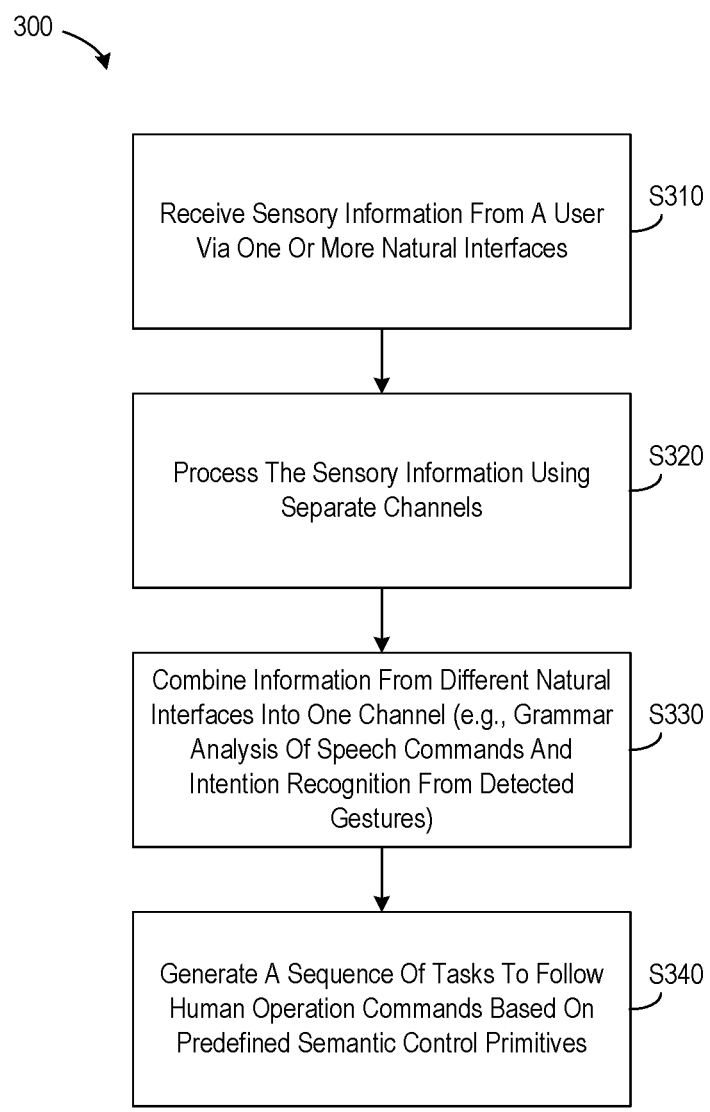
FIG. 3 is a flow diagram illustrating a process for integrating human natural interaction with task primitives according to some embodiments.

Reference is now made to FIGS. 2 and 3, which will be discussed together.

FIG. 2 is a block diagram of an overall system architecture 200 according to some embodiments. Embodiments are not limited to architecture 200. Architecture 200 includes data collection module 210, speech library 225, speech recognition engine 230, grammar analysis engine 235, gesture library 245, gesture recognition engine 250, intention recognition engine 255, semantic control primitives database 260, decision module 270, task planning module 280, and task execution module 290.

FIG. 3 is a flow diagram that illustrates a process 300 that may be performed according to aspects of the present disclosure in the system of FIG. 2. The process 300 may be performed by an autonomous unmanned robot such as a drone, submersible, or some other robot. Referring to FIG. 3, initially, at S310 the method includes device collection module 210 receiving/capturing sensory information (e.g., speech information and gesture information) from a user via natural user interface (also referred to as "NUI" or "natural interface"). Generally, a natural interface is a system for human-computer interaction that the user operates through natural (e.g., everyday) human behaviors/interactions.

The term "sensory information" or "sensory input" as used herein, may include, without limitation, information that can be sensed by sight (e.g., visual information) and sound (e.g., auditory information) and/or any combination thereof (e.g., audiovisual information). Some techniques for capturing sensory information are described below. Other techniques for capturing sensory information are possible.

In an example embodiment, data collection module 210 comprises speech sensing system 220 and gesture sensing system 240 which capture sensory information using input sensor devices. Speech sensing system 220 generally comprises sensing device(s) that detect speech of a subject/user. Gesture sensing system 240 generally comprises sensing device(s) that detect motion of a subject/user. According to some embodiments, at S310, speech sensing system 220 captures speech using a sound sensing device 222 (e.g., a microphone) and gesture sensing system 240 captures spatial/body gestures using a skeleton tracking device 242 and/or arm/hand gestures using a gesture recognition device 244 worn by a user. The natural interface senses data (e.g., acoustic data, skeleton data, and electromyographic (EMG) data) and analyzes this data to detect and identify when the user is attempting to effect control of the interface.

Next, at S320, the speech information and the gesture information are processed in different channels, namely, a speech command channel and a gesture channel. As shown in FIG. 2, the channels can be used separately or in combination (e.g., jointly) depending on the system and/or customer requirements.

Speech Recognition and Grammar Analysis

In one channel, speech recognition engine 230 processes input frames of speech from speech sensing system 220 against a library of speech models 225 (also referred to as "speech library") with which to match input speech commands.

In some embodiments, the speech recognition engine 230 is Lexical grammar driven. For example, the grammar structure is designed first to describe all possible commands to be used in the system for industrial inspection. Then, the keywords in these grammar structures (e.g., including verbs, asset names, places, etc. related to inspection tasks) are also defined. After that, a speech recognition process is deployed to recognize the grammar of a sentence and the keywords within the sentence. The speech recognition process may be applied in accordance with any known speech recognition technique or technology.

Grammar analysis engine 235 analyzes the keywords extracted from the sentence. As output, the sentence is converted to a command that can be recognized by the robot.

Gesture Recognition and Intention Recognition

In another channel, gestures (e.g., position/pose of joints, and positions/pose of the hand, arm, finger, etc.) are pre-defined in the system 200 and stored in gesture library 245. As described above, gesture data (e.g., recognized based on movement via motion sensors) may be collected using a skeleton tracking device 242 and a gesture recognition device 244. A definer (e.g., user, operator, designer, etc.) defines certain desired gestures for use and a training algorithm is used to model such gestures. To do so, the gesture recognition engine 250 may apply any known machine learning process, and the disclosed embodiments are not limited to any particular model or algorithm, and may vary as necessary or desired.

Machine learning models are used to recognize the gestures. Data samples (e.g., gesture data) are collected from human users using gesture/motion sensing devices (e.g., a skeleton tracking device 242 and a gesture recognition device 244), and the data is used to train and build models. Thereon, when a new group of signals are detected, the model generates a recognized and classified gesture.

In some embodiments, a Support Vector Machine (SVM) may be used to recognize static gestures and a Recurrent Neural Network (RNN) may be used to recognize dynamic moving gestures. The difference is that RNN can incorporate temporal information.

In some embodiments, a deep learning model is used to train a classifier. Using the skeleton data from the skeleton tracking device and EMG data from the gesture recognition device, the deep learning based classifier can automatically learn the gesture of a human.

In this regard, intention recognition 255 operates as follows. A social Bayesian recognition model is represented as:

$$\text{result} = _y^{argmax}(p(y|x,s)) \quad (1)$$

where x is the recognized hand-gesture of the human, s is the current task-relevant environmental situation, and y is the estimation of the human intention.

According to Bayesian rule, given the observed gesture x and the current task context s, the probability of the determined intention y can be computed using equation (2).

$$p(y|x,s) = \frac{p(x,s|y)p(y)}{p(x,s)} \quad (2)$$

Using standard probability theory, p(x,s) and p(x, s|y) can be computed using equations (3) and (4). p(y) is a scaling factor.

$$p(x,s) = p(s|x)p(x) \quad (3)$$

$$p(x,s|y) = p(x|s,y)p(s|y) \quad (4)$$

p(s|x), p(x|s, y), and p(s|y) are trained through a normal machine learning process which is related to tasks. p(x) is the input of the recognition model, which processes the data from perception sensors (e.g., cameras).

p(x) is obtained from gesture recognition 250, and can be computed using the following process.

First, the positions/poses of the key points of a human body are recorded. For example, when using a skeleton tracking device, skeleton data of the human body (e.g., joints) are recorded. Also for example, when using a gesture recognition device, the positions and orientations of the fingertips of a hand are recorded.

Next, the positions of the key points are converted to a principal component vector, using Principal Component Analysis (PCA) to arrive at:

$$z = (z_1, z_2)^T \quad (5)$$

where z is the principal component of the observed human gesture.

Given an observed human gesture, a Gaussian model is used to represent the probability of recognized gesture:

$$bel(x_i) = p(x_i|z) \quad (6)$$

where $x_i$ represents one type of hand gesture, and:

$$bel(x_i) = \det(2\pi Q_i)^{-1} \exp\{-\tfrac{1}{2}(z-\mu_i)^T Q_i^{-1}(z-\mu_i)\} \quad (7)$$

where $\mu_i$ is the mean of the observation model related to the pre-defined human gesture $x_i$, and $Q_i$ is the co-variance matrix. The mean and covariance matrix are stored in memory.

Decision-Making

Once the sensory information is processed, the information from the different natural interfaces (e.g., speech and gesture) are combined into one channel in the decision-making stage at step S330.

In an example embodiment, rule based decision-making mechanism 270 is designed to combine the recognized information from the grammar analysis 235 of the speech commands and the intention recognition 225 from the detected gestures. In some embodiments, this rule based mechanism first uses the speech commands to form the basis of the result, and then uses the intention recognition result to adjust the parameters or commands within this result. This adjustment is based on the confidence score from the two channels. Many times, the speech command channel will produce a higher score than the gesture channel.

Task Planning and Semantic Control Primitives

At S340, after human commands have been recognized, a task planning mechanism 280 is used to generate a sequence of tasks (e.g., for a UAV) to follow a human operators' commands. The task planning mechanism 280 relies on predefined semantic control primitives, which are described next.

Semantic control primitives database 260 stores pre-defined or pre-learned semantic control primitives.

Descriptions of a semantic control primitive are categorized into several fields, each field includes one or more parameters describing the field. Example descriptions/fields of semantic control primitives include a "name" of the field, "motion properties", "cost properties", "human collaboration properties", "pre-conditions", "post-results", "constraints", and "hardware platform properties."

More specifically, the motion properties field includes one or more motion-related parameters including, for example, motion control methods (e.g., position, tracking, velocity, etc.), motion limits, and motion type (e.g., relative control, absolute control, etc.).

The cost properties field describes the hardware and software cost (e.g., energy consumption) when using a particular control primitive (e.g., flying at high speeds).

Some control primitives are allowed to be guided or intervened by human operators. A human collaboration properties field describes whether human-shared control or human collaboration is enabled for a particular control primitive. For example, landing primitives (e.g., in landing a UAV) cannot be interrupted, whereas in-flight primitives (e.g., lateral flying around an object) may be interrupted or affected by human interaction or collaboration.

The preconditions field describes one or more preconditions for using a control primitive (e.g., the UAV first taking off before flying, where take off is a precondition to flying).

The post-results field describes one or more results of using a control primitive (e.g., in flying a UAV from 20 meters to 100 meters high, the post-result would be a latitude of 100 meters and an unchanged longitude).

The constraints field describes one or more constraints when using a control primitive (e.g., weather, lighting, flying zone, safety, etc.).

The hardware platform properties field describes which control primitives may be implemented using each type of hardware platform (e.g., low-tech drones may not be able to implement a control primitive that includes flying at high speeds).

Figure 4:
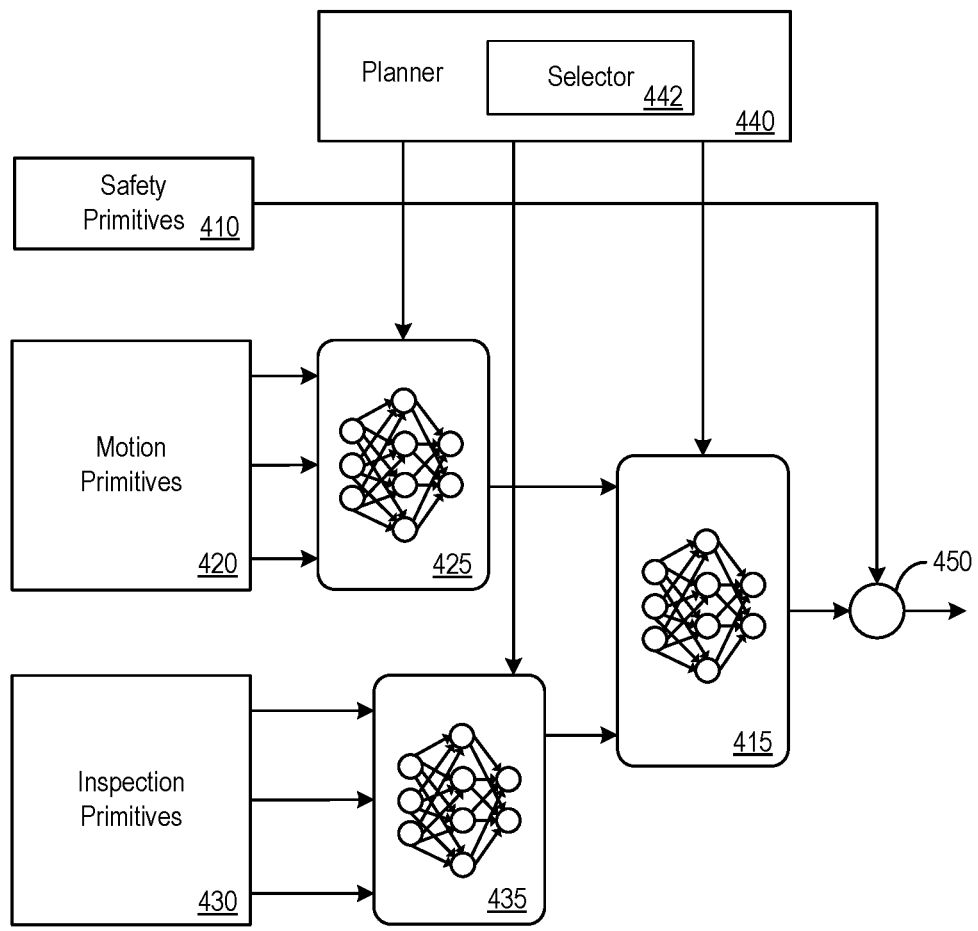
FIG. 4 is a more detailed diagram of an illustrative example of a task planner of FIG. 2 implementing the method according to some embodiments.

FIG. 4 is a more detailed diagram of an illustrative example of a task planner 280 of FIG. 2, which includes a selector, implementing the method according to some embodiments. More specifically, FIG. 4 is a diagram illustrating a process for assembling control primitives in accordance with an example embodiment. Each control primitive is abstracted (e.g., generalized) and provides an interface for the selector 442 of task planner 440 to use (e.g., selecting the parameters that allow for optimization of the system).

In an example embodiment, the semantic control primitives may be categorized as one or more of a plurality of types of primitives including safety primitives 410, motion primitives 420, and inspection primitives 430. The motion primitives 410 describe how the UAV flies, the inspection primitives 420 describe how sensor data are collected, and the safety primitives 430 describe how the UAV can safely work in the environment.

In some embodiments, the control primitives are assembled together in a sequential order to produce a larger ("super") control primitive at 415, 425, 435. Alternatively, the control primitives are assembled in parallel. As can be seen in FIG. 4, safety primitives 410 have the highest priority and can inhibit all other primitives at 450.

Once the control primitives are assembled, the outcome 450 is an even larger ("super") control primitive associated with one sub-task unit. In an example where a task comprises multiple sub-tasks, the output 450 of each sub-task is combined to form an overall output used to drive the UAV (e.g., combining outputs of multiple FIG. 4s). In this way, the intention of the human operator as well as environmental information are used in the decision-making process to drive and control the robot.

Figure 5:
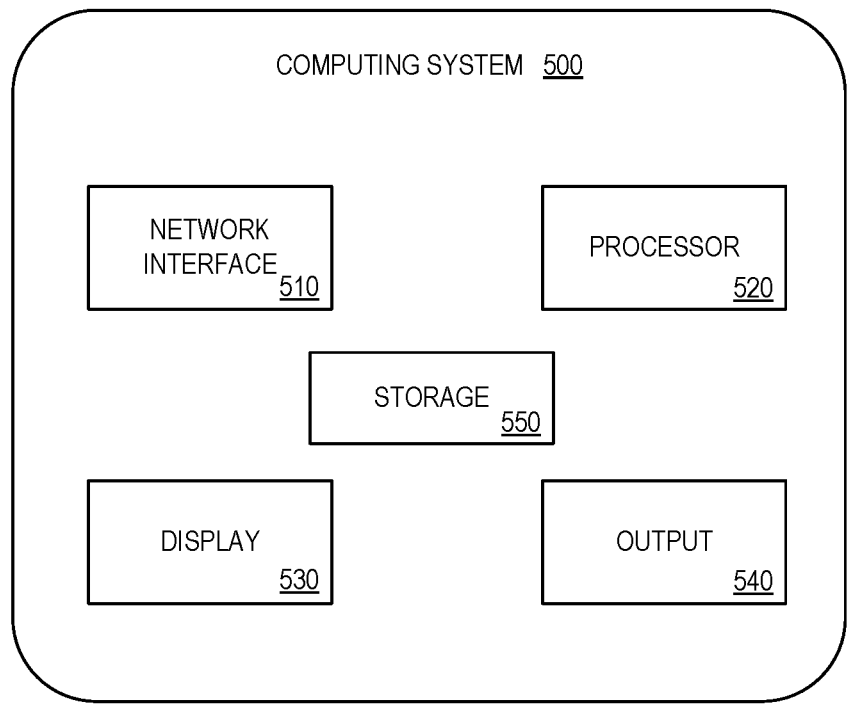
FIG. 5 is a block diagram of a computing system according to some embodiments.

The embodiments described herein may be implemented using any number of different hardware configurations. For example, FIG. 5 is a block diagram of a computing system 500 that may be, for example, associated with the system 200 of FIG. 2 for controlling and commanding an unmanned robot using natural interfaces. For example, the computing system 500 may be a device or group of devices that communicate with a robot and control the robot via a wired or wireless connection. Referring to FIG. 5, the computing system 500 includes a network interface 510, a processor 520, a display 530, an output 540, and a storage device 550. Although not shown in FIG. 5, the robotic system 500 may include other components such as an input unit, one or more storage devices, etc. The network interface 510 may be a data communication interface that transmits and receives data over a network such as the Internet, a private network, a public network, and the like, via a satellite network, a cellular network, a local network, and/or the like.

The processor 520 may include one or more processing devices each including one or more processing cores. In some examples, the processor 520 is a multicore processor or a plurality of multicore processors. Also, the processor 520 may be fixed or it may be reconfigurable.

The processor 520 communicates with the storage device 550. In some embodiments, the storage device 550 may store a program (not separately shown) for controlling the processor 520. The processor 520 performs instructions of the programs, and thereby operates in accordance with any of the embodiments described herein. In some embodiments, the storage device 550 may store a speech library 225 for performing speech recognition, gesture library 245 for preforming gesture recognition and semantic control primitives database 260 for decision-making and task planning. The storage device 550 may also store data captured while the computing system 500 performs the speech recognition/grammar analysis 230, 235 and gesture recognition/intention recognition 250, 255 processes. Note that the storage device 550 described herein is only one example, and additional and/or different information may be stored therein. Moreover, various databases might be split or combined in accordance with any of the embodiments described herein. The storage device 550 is not limited to any particular storage device and may include any known memory device such as RAM, ROM, hard disk, and the like. The output 540 may output a task execution plan comprising a sequence of tasks for the unmanned robot to a display or another device or system such as the unmanned robot itself and/or a control device.

The display 530 may display a user interface and other data via an embedded display of the system 500 or another device externally connected to the system 500, and the like. The output 540 may output the user interface and other data to the display 530.

Although the examples herein are provided, for the most part, with respect to assets on land it should be appreciated that the embodiments may be incorporated with submersible drones for inspecting underwater assets. In this situation, the travel path would be created in the same way but instead of a travel path being through the air it would be through water or some other liquid based environment such as oil, etc.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/ machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system, comprising:
a memory storing instructions; and
a processor configured to execute the instructions, wherein the instructions, when executed by the processor, cause the processor to:
receive a plurality of sensory inputs from a user via one or more user interfaces, wherein the plurality of sensory inputs comprises an acoustic input of the user and a gesture input of the user;
process each of the plurality of sensory inputs using a plurality of different channels of processing to generate a first recognition result corresponding to the acoustic input and a second recognition result corresponding to the gesture input;
determine a basis of a recognized command based on the first recognition result;
subsequently adjust the basis of the recognized command based on the second recognition result to generate the recognized command; and
generate, based on the recognized command and one or more predefined control primitives, an inspection plan to be executed by an unmanned robot to collect inspection data of an asset.

2. The computing system of claim 1, wherein the instructions, when executed by the processor, cause the processor to:
perform speech recognition and grammar analysis on the acoustic input using a first channel of processing of the plurality of different channels of processing; and
perform gesture recognition and intention recognition on the gesture input using a second channel of processing of the plurality of different channels of processing.

3. The computing system of claim 1, wherein the instructions, when executed by the processor, cause the processor to calculate a confidence score for each of the first recognition result and the second recognition result.

4. The computing system of claim 1, wherein the one or more predefined control primitives are associated with at least one of: a safety primitive, a motion primitive, and an inspection primitive.

5. The computing system of claim 1, wherein the one or more user interfaces include at least one of: a sound sensing device, a motion sensing device, and a gesture sensing device.

6. The computing system of claim 1, wherein the plurality of different channels of processing is operable separately and in combination.

7. A computer-implemented method, comprising:
receiving a plurality of sensory inputs from a user via one or more user interfaces, wherein the plurality of sensory inputs comprises an acoustic input of the user and a gesture input of the user;
processing each of the plurality of sensory inputs using a plurality of different channels of processing to generate a first recognition result corresponding to the acoustic input and a second recognition result corresponding to the gesture input;
determine a basis of a recognized command based on the first recognition result;
subsequently adjust the basis of the recognized command based on the second recognition result to generate the recognized command; and
generating, based on the recognized command and one or more predefined control primitives, an inspection plan to be executed by an unmanned robot to collect inspection data of an asset.

8. The computer-implemented method of claim 7, wherein processing each of the plurality of sensory inputs comprises:
performing speech recognition and grammar analysis on the acoustic input using a first channel of processing of the plurality of different channels of processing; and
performing gesture recognition and intention recognition on the gesture input using a second channel of processing of the plurality of different channels of processing.

9. The computer-implemented method of claim 7, further comprising calculating a confidence score for each of the first recognition result and the second recognition result.

10. The computer-implemented method of claim 7, wherein the one or more predefined control primitives are associated with at least one of: a safety primitive, a motion primitive, and an inspection primitive.

11. The computer-implemented method of claim 7, wherein the one or more user interfaces include at least one of: a sound sensing device, a motion sensing device, and a gesture sensing device.

12. The computer-implemented method of claim 7, wherein the plurality of different channels of processing is operable separately and in combination.

13. A non-transitory computer-readable medium having instructions stored thereon, wherein the instructions, when executed by a processor, cause the processor to perform a method comprising:
receiving a plurality of sensory inputs from a user via one or more user interfaces, wherein the plurality of sensory inputs comprises an acoustic input of the user and a gesture input of the user;
processing each of the plurality of sensory inputs using a plurality of different channels of processing to generate a first recognition result corresponding to the acoustic input and a second recognition result corresponding to the gesture input;
determine a basis of a recognized command based on the first recognition result;

subsequently adjust the basis of the recognized command based on the second recognition result to generate the recognized command; and generating, based on the recognized command and one or more predefined control primitives, an inspection plan to be executed by an unmanned robot to collect inspection data of an asset.

14. The non-transitory computer-readable medium of claim 13, wherein processing each of the plurality of sensory inputs comprises:

performing speech recognition and grammar analysis on the acoustic input using a first channel of processing of the plurality of different channels of processing; and performing gesture recognition and intention recognition on the gesture input using a second channel of processing of the plurality of different channels of processing.

15. The non-transitory computer-readable medium of claim 13, wherein the method further comprises calculating a confidence score for each of the first recognition result and the second recognition result.

16. The non-transitory computer-readable medium of claim 13, wherein the one or more predefined control primitives are associated with at least one of: a safety primitive, a motion primitive, and an inspection primitive.

17. The non-transitory computer-readable medium of claim 13, wherein the one or more user interfaces include at least one of: a sound sensing device, a motion sensing device, and a gesture sensing device.

18. The computing system of claim 1, wherein the asset is an industrial asset.

19. The computing system of claim 18, wherein the industrial asset comprises at least one of an oil platform, a tank, a pipeline, a bridge, a dam, a gas flare, a turbine, a power grid, an aircraft, or a locomotive.

* * * * *